US012010478B2

(12) United States Patent
Lee

(10) Patent No.: US 12,010,478 B2
(45) Date of Patent: Jun. 11, 2024

(54) OPEN AUDIO DEVICE

(71) Applicant: Bose Corporation, Framingham, MA (US)

(72) Inventor: Vincent James Lee, San Francisco, CA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/103,019

(22) Filed: Jan. 30, 2023

(65) Prior Publication Data

US 2023/0179906 A1 Jun. 8, 2023

Related U.S. Application Data

(63) Continuation of application No. 17/688,463, filed on Mar. 7, 2022, now Pat. No. 11,582,547, which is a continuation of application No. 17/484,756, filed on Sep. 24, 2021, now Pat. No. 11,284,182, which is a continuation of application No. PCT/US2020/066075, filed on Dec. 18, 2020.

(60) Provisional application No. 62/952,873, filed on Dec. 23, 2019.

(51) Int. Cl.
*H04R 25/00* (2006.01)
*H04R 1/10* (2006.01)

(52) U.S. Cl.
CPC .................................... *H04R 1/105* (2013.01)

(58) Field of Classification Search
CPC ........ H04R 5/04; H04R 1/1091; H04R 1/105; H04R 1/1058; H04R 1/1008; H04R 1/1025
See application file for complete search history.

(56) References Cited

U.S. PATENT DOCUMENTS 6,449,374 B1 * 9/2002 Skulley .................. H04R 1/083 381/381
8,111,854 B2 * 2/2012 Peng .................... H04R 1/1075 381/370
10,382,851 B1 * 8/2019 Smith .................. H04R 1/1016
2014/0270317 A1 9/2014 Burgett et al.
2020/0128335 A1 * 4/2020 El Guindi ............ H04R 25/505

FOREIGN PATENT DOCUMENTS

WO 2019164553 A1 8/2019

OTHER PUBLICATIONS

First Japanese Office Action dated Jul. 31, 2023 for Japanese Patent Application No.: 2022-538848.

* cited by examiner

*Primary Examiner* — Amir H Etesam

(57) ABSTRACT

An open audio device includes an acoustic module and a body that supports the acoustic module. The acoustic module is configured to be located at least in part on the outer ear and defines a first sound-emitting opening that is configured to be proximate but spaced from the user's ear canal. The body includes a housing and a bridge that couples the acoustic module to the housing. The housing is configured to be located behind an outer ear of a user and in contact with at least one of the outer ear and the head proximate the intersection of the head and the outer ear. The bridge is constructed to have bending compliance.

18 Claims, 9 Drawing Sheets

OPEN AUDIO DEVICE

CROSS-REFERENCE TO RELATED APPLICATIONS

This application is a continuation of U.S. application Ser. No. 17/688,463, filed Mar. 7, 2022, which is a continuation of U.S. application Ser. No. 17/484,756 filed on Sep. 24, 2021, which itself claimed priority to PCT/US2020/066075, filed on Dec. 18, 2020, which itself claimed priority to Provisional Patent Application 62/952,873, filed on Dec. 23, 2019. The entire disclosures of all prior applications are incorporated by reference herein for all purposes.

BACKGROUND

This disclosure relates to an audio device that is configured to be worn on the ear.

Wireless headsets deliver sound to the ear. Most wireless headsets include an earbud that is placed into the ear canal opening. Earbuds can inhibit or prevent the user from hearing speech and ambient sounds. Also, earbuds send a social cue that the user is unavailable for interactions with others.

SUMMARY

All examples and features mentioned below can be combined in any technically possible way.

In one aspect, an open audio device includes a body with an inner surface that is configured to be located behind an outer ear of a user and in contact along a length of the body at multiple locations of at least one of the outer ear and the head proximate the intersection of the head and the outer ear, wherein the inner surface of the body lies generally along a decaying helix. There is an acoustic module carried by the body and configured to be located against the outer ear above the ear canal opening.

Some examples include one of the above and/or below features, or any combination thereof. In some examples the body is configured to contact at least one of the outer ear and the head proximate the intersection of the head and the outer ear along most of the length of the body. In an example the body has a free distal end that is configured to be located proximate a lower end of the helix of the ear, and the body is configured to contact at least one of the outer ear and the head proximate the intersection of the head and the outer ear, both proximate an upper end of the helix and proximate the free distal end of the body. In an example the open audio device is configured to contact the ear and head at contact locations comprising the acoustic module contacting the ear above the ear canal, and contacts of the body with at least one of the outer ear and the head proximate the intersection of the head and the outer ear, both proximate an upper end of the helix and proximate the free distal end of the body. In an example these contact locations generally define apices of a triangle such that the contacts help stabilize the open audio device on the ear and head. In some examples the acoustic module comprises an inner surface that is configured to contact both the outer ear above the ear canal opening and a portion of the head just anterior thereof.

Some examples include one of the above and/or below features, or any combination thereof. In some examples the body depends from the acoustic module and comprises a bridge that is coupled to the acoustic module and a housing that is more distal from the acoustic module than is the bridge. In an example the acoustic module comprises an inner surface that is configured to contact the outer ear above the ear canal opening. A first plane can be defined that is at least partially co-planar with the inner surface of the acoustic module. A second plane can be defined that bisects the bridge. In an example these two planes meet at an acute angle. In an example this acute angle is about 30 degrees. In an example a line that represents a contact rotational axis of the bridge is angled to the first plane at an obtuse angle in two of three axes from the normal vector of the first plane. In an example these obtuse angles are about 165 and 115 degrees, to a tolerance of approximately +10, −0 degrees.

Some examples include one of the above and/or below features, or any combination thereof. In an example the bridge is thinner than the housing. In some examples the housing has inner and outer curved surfaces. In an example the inner and outer curved surfaces of the housing have approximately the same radii of curvature. In an example an inner surface of the bridge has a smaller radius of curvature than does an inner surface of the housing. In an example the housing has a generally teardrop cross-sectional shape. In an example the housing has a thickness of from about 6 mm to about 12 mm.

Some examples include one of the above and/or below features, or any combination thereof. In some examples the acoustic module comprises an audio driver that emits sound from both a front side and a rear side and the acoustic module has a sound-emitting nozzle that emits front-side sound and a low-frequency dipole opening that emits rear-side sound. In an example the nozzle is configured to be closer to the ear canal opening than is the low-frequency dipole opening. In an example the acoustic module further comprises first and second microphone openings that are configured to conduct sound pressure to first and second microphones, and the microphone openings lie generally within about +/−30 degrees to an axis that intersects an expected location of the mouth of the user. In an example the body is an integral molded plastic member. In an example the acoustic module is configured to sit against the outer ear fossa and a portion of the head adjacent to and anterior of the fossa.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Disclosed herein is an open audio device, such as a wireless headset, that delivers sound close to an ear canal opening but does not block or obstruct the ear canal. The open audio device is carried on the ear and portions of the head adjacent to the ear. The open audio device is configured to be positioned such that it lightly and comfortable clamps on the upper ear and locates an acoustic module against the ear above the ear canal such that the ear canal remains open to receive speech and environmental sounds. The open audio device engages with the ear such that it remains in place even as the user moves the head.

Exemplary open audio device 10 is depicted in FIGS. 1A-1G. Open audio device 10 is specifically designed to be carried on the right ear. The open audio device for the left ear is a mirror image; see FIG. 3B for an example. A right ear and adjacent head regions are shown in FIGS. 2A-2C, which help in an understanding of how the open audio device is engaged with the ear and head.

Figure 1A:
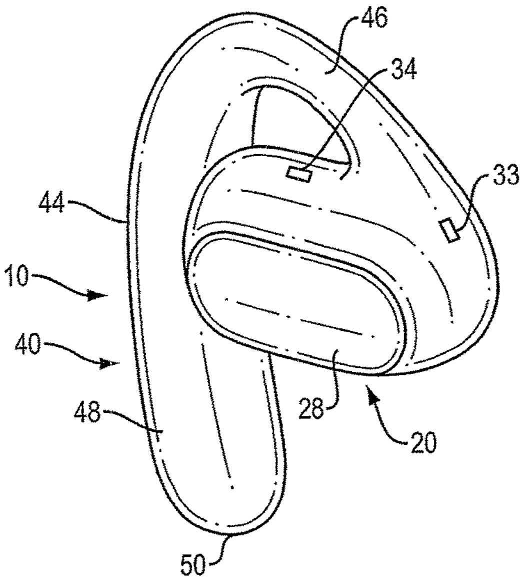
FIGS. 1A-1G are perspective, front, rear, left side, right side, top, and bottom views, respectively, of an open audio device designed for the right ear.

Open audio device 10 is carried by outer ear 82 and portions 112 and 114 of the head 110 that are behind and just in front of (i.e., adjacent to) the ear, respectively, as is further described elsewhere herein. Open audio device 10 comprises acoustic module 20 that contains in its interior an electro-acoustic transducer or audio driver (not shown). Acoustic module 20 is configured to locate sound-emitting opening 22 above the ear canal opening 86, which is behind (i.e., generally underneath) ear tragus 84. Acoustic module 20 has inner face 26 and opposed outer face 28. In some examples faces 26 and/or 28 are generally flat, as shown in FIGS. 1A-1G. Advantageously, positioning the acoustic module 20 above the ear canal opening 86 leaves the ear canal opening unobstructed when viewed from both the side and front, which visually signals to others around the user that the user is open and able to interact with his or her environment. In an example acoustic module 20 has a second sound-emitting opening 24 that is farther from the ear canal than opening 22. Openings 22 and 24 can emit sound from opposite sides (e.g., front and back) of an audio driver and so the sounds are out of phase. The out of phase sounds will tend to cancel in the far field and so the openings act like a low-frequency dipole. However, opening 22 is close enough to the ear canal that much of its sound is not cancelled before it reaches the ear. In an example acoustic module 20 carries at least two microphones. FIG. 1A illustrates openings 33 and 34 that lead to microphones (not shown, located inside of acoustic module 20). In an example an axis through both of the microphone openings will be within about +/−30 degrees of the expected location of the user's mouth so that the microphones can be arrayed/beamformed, as is known in the field.

Audio device 10 further includes body 40 that is configured to be worn on or abutting outer ear 82 such that body 40 contacts the outer ear and/or the portion of the head that is just behind and abuts the outer ear, at two or more separate, spaced contact locations. Audio device 10 is configured to gently grip the outer ear, the portion of the head just in front of (anterior to) the ear, and the portion of the head just behind the rear of outer ear 82, as explained in more detail below.

Figure 2B:
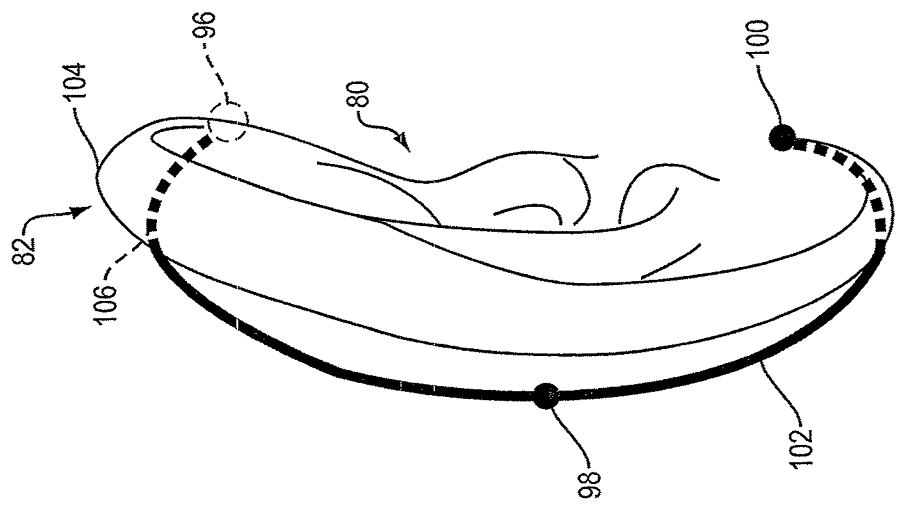
FIG. 2B is a rear perspective view of the ear of FIG. 2A.
Figure 2A:
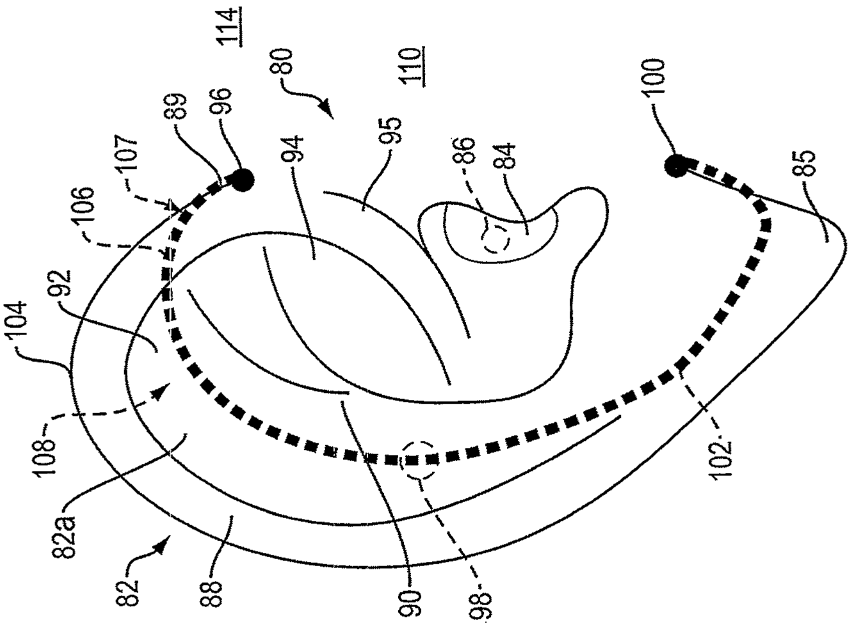
FIG. 2A is an enlarged side view of a representative right ear.
Figure 2C:
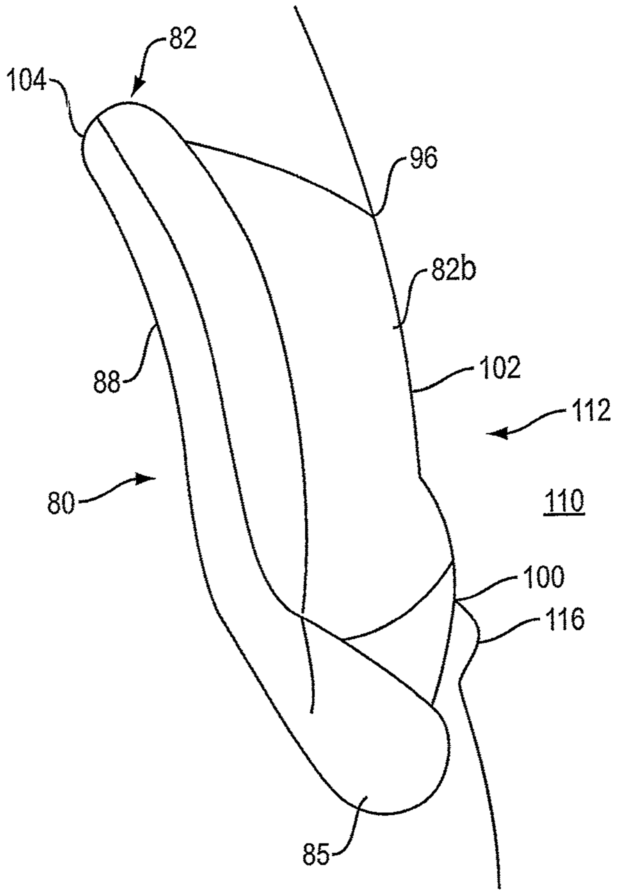
FIG. 2C is a rear view of the ear of FIGS. 2A and 2B and the adjacent area of the head.

FIGS. 2A-2C illustrate aspects of the ear 80, especially the outer ear 82 (sometimes referred to as the pinna) and adjacent parts of the head that are useful in understanding the open audio device of this disclosure and its engagement with the ear and head. Outer ear 82 includes helix 88 (with its upper end 89 where it meets the head), anti-helix 90, fossa 92, concha cymba 94, crus of helix 95, tragus 84, ear canal opening 86, and earlobe 85. Line 102 represents the intersection of the outer ear 82 and the head 110. Intersection 102 has an upper end 96 termed the otobasion superius, and a lower end 100 termed the otobasion inferius, while the most posterior part 98 of intersection 102 is termed the otobasion posterius. Intersection 102 typically exhibits an arch 106 between area 107 close to otobasion superius 96 and area 108 where the intersection begins its descent toward otobasion posterius 98. The outer ear comprises rear portion 82*b* that abuts intersection 102. The head 110 comprises portion 112 just behind the ear and abutting the ear's rear portion 82*b*. The head also comprises portion 114 just in front of the upper portion 104 of the outside 82*a* of outer ear 82. Also, the head typically includes a dimple or depression 116 (FIG. 2C) adjacent to the otobasion inferius and the earlobe; dimple 116 is typically but not necessarily located in most heads very close to or abutting or just posterior of the otobasion inferius 100, as shown in FIG. 2C.

Figure 1B:
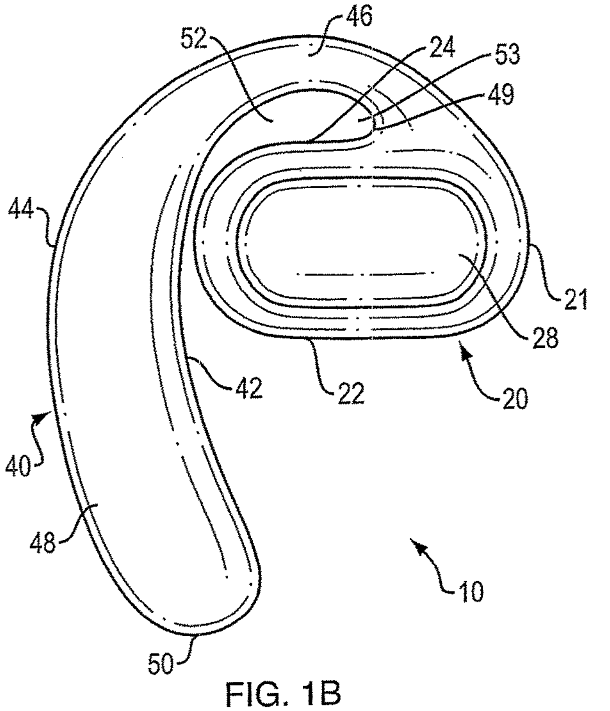
Figure 1C:
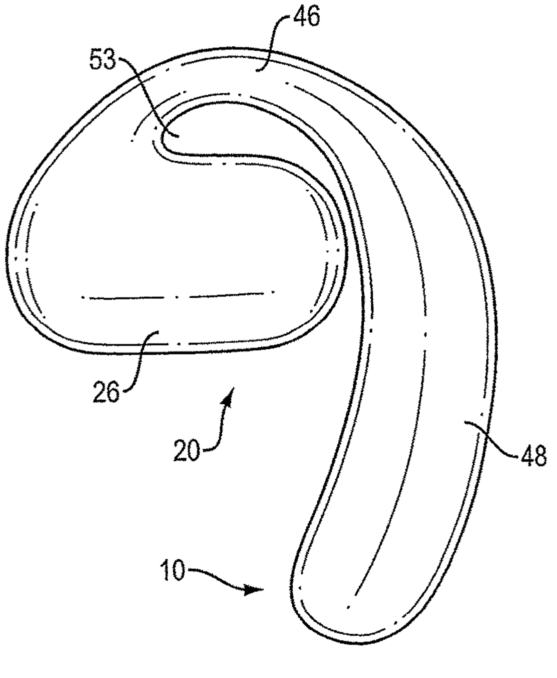
Figure 1D:
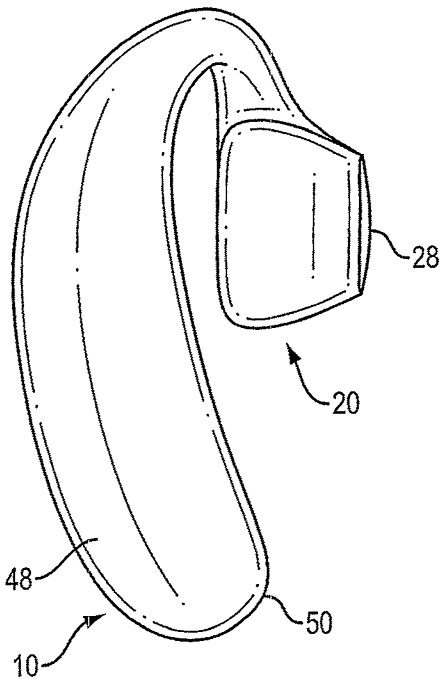
Figure 1E:
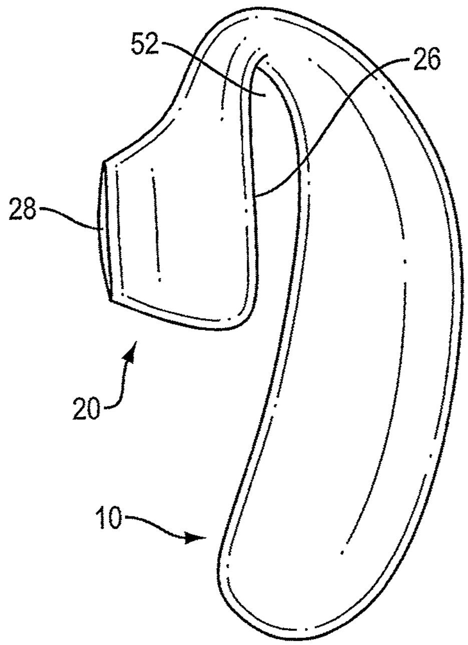
Figure 1F:
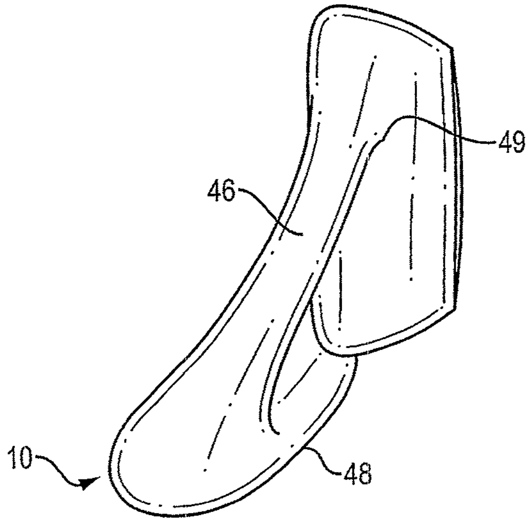
Figure 1G:
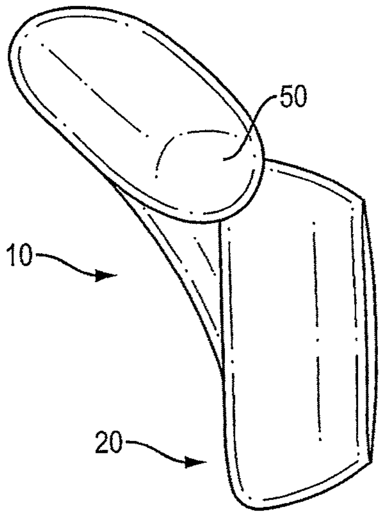
Figure 3B:
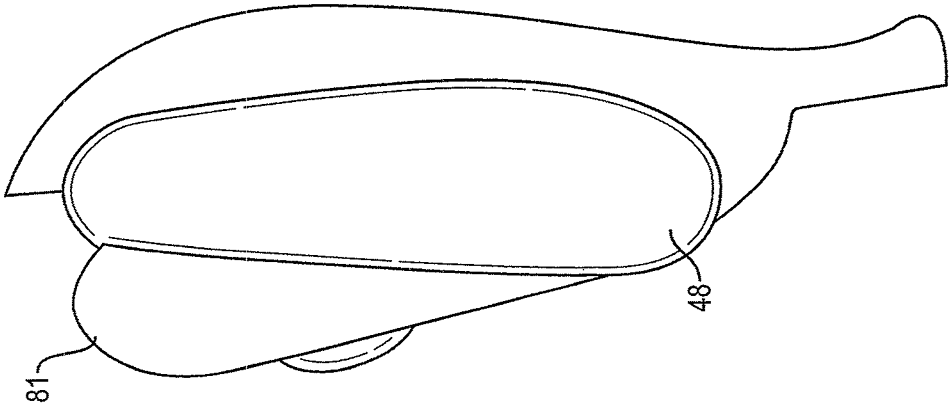
FIG. 3B is a rear view of a mirror image version of the open audio device of FIGS. 1A-1G, configured to be mounted on the left ear.

Turning back to FIGS. 1A-1G, open audio device body 40 comprises curved bridge portion 46, and housing 48 with free distal end 50. Bridge 46 merges smoothly into acoustic module 20, e.g., as shown in FIG. 1B, such that the beginning of the outer surface 44 of bridge 46 is tangent to the front curved portion 21 of acoustic module 20. Bridge 46 is thinner than housing 48. One reason is so that room is available for eyeglass temple pieces to still fit on the ear when a user is wearing the open audio device, as shown in FIG. 3B. In an example body 40 is an integral molded plastic member. In an example body 40 is made of a non-plastic stiff material, such as metal. Body 40 is in an example relatively stiff, but may have some compliance in bridge portion 46 as described below.

Figure 3A:
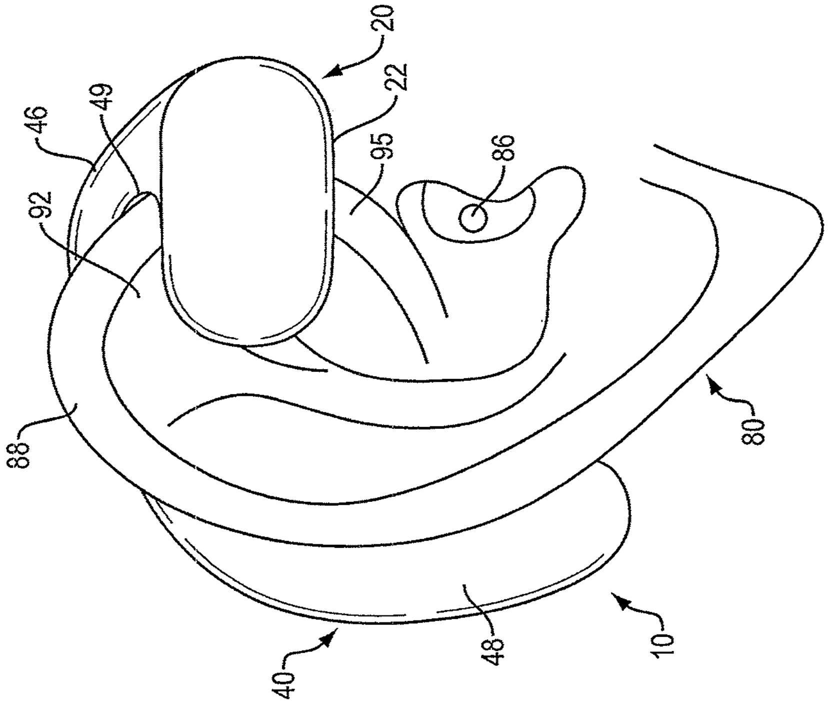
FIG. 3A is a side view of the open audio device of FIGS. 1A-1G mounted on the right ear.

Body 40 is generally configured to be located behind the outer ear, as shown in FIGS. 3A and 3B. Gap 52 between body 40 and acoustic module 20 is generally sized and shaped to allow the upper portion 104 of outer ear 82 to fit through the opening, with the upper or closed end 53 of gap 52 located such that the upper end of the helix 89 is fitted in gap portion 53. The upper end of the helix 89 thus becomes a point about which open audio device 10 can pivot or rotate.

Almost all of body 40 sits behind the ear, along the intersection of the back of the ear and the head. See FIG. 3B, which illustrates body 40 behind the left ear. Note that the open audio device illustrated in FIG. 3B is designed for the left ear 81 and so is a mirror image of open audio device 10 illustrated in FIGS. 1A-1G. Body 40 is sized, shaped, contoured and angled relative to acoustic module 20 such that body 40 generally follows the shape and contour of the ear-head intersection and contacts the ear and/or head along much of the length of body 40, most of the way to, or almost to, free distal end 50. At the same time, for most ears body 40 is thick enough such that it slightly pushes the back 82*b* of the outer ear out or away from the head. This bend of the ear causes a slight force against body 40 that tends to push it against the head. In an example acoustic module 20 has an inner face 26 that is configured to sit against the front portion 82*a* of outer ear 82 (e.g., against one or more of fossa 92, anti-helix 90, crus of helix 95, and helix 88) as well as the portion 114 of the head 100 that is located immediately anteriorly of upper ear portion 104. The portion of acoustic module 20 proximate the uppermost point 49 of inside surface 42 of body 40 may sit under helix 88.

The head and the upper portion 104 of the ear that lies on or very close to the head are stiffer than is the protruding back 82*b* of the outer ear. Since acoustic module 20 is at least in part sitting against a hard surface (the head and parts of the ear that lie against or very close to the head), it is not able to move closer to the head. This forces body 40 to push out into outer ear 82, which creates an opposing force that tends to rotate open audio device 10 about point 49. This results in three constraining device anchoring locations, which include the device contacting the helix around point 49, the acoustic module 20 resting against the ear and head, and the body 40 pushing toward the head due to the slightly bent soft part of the ear. The flexibility of the outer ear loads/preloads these three points to ensure they are always experiencing a normal force. The flexibility of the outer ear thus contributes to a stable yet comfortable fit of open audio device 10. Also, since the three anchoring locations are not linear they generally define the apices of a triangle, which creates greater stability than if the anchor locations were aligned. Open audio device 10 is thus gently but firmly held on the head, even when the head moves.

Figure 4A:
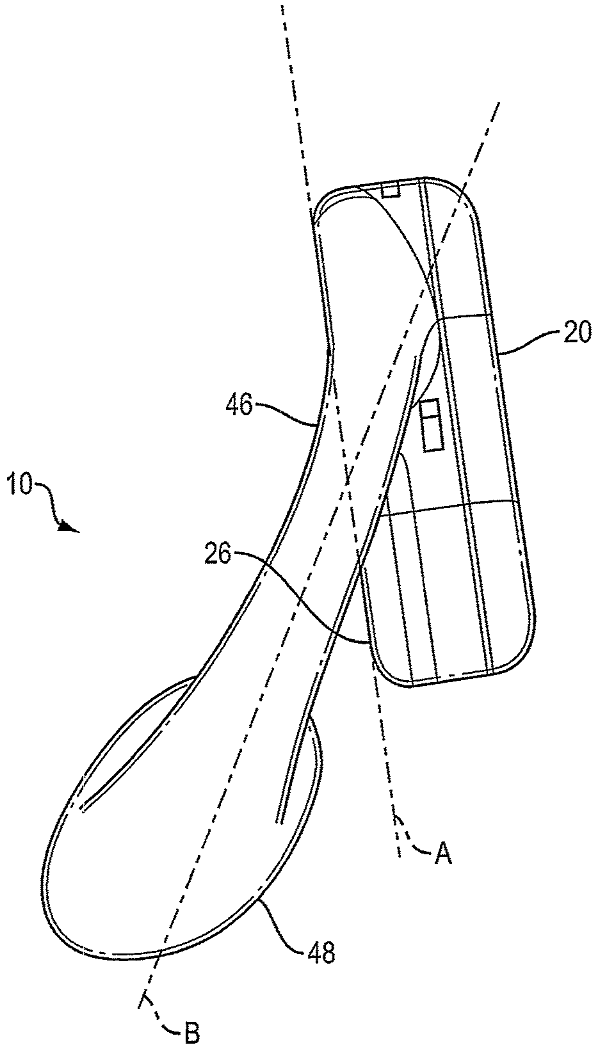
FIGS. 4A and 4B illustrate two angles between different portions of an open audio device.

FIG. 4A illustrates one spatial relationship of the bridge 46 and the acoustic module 20 of open audio device 10. A first generally vertical plane, seen from above as in FIG. 4A, appears as line "A." This plane is coplanar with some or all of the flat or substantially flat inner face 26 of acoustic module 20. Where this first plane bisects the width of bridge 46, a second generally vertical plane that bisects the bridge across its width along its longitudinal extent is placed, and appears from above as line "B." The planes represented by lines A and B intersect at an acute angle, which in one example is about 30 degrees. Angling bridge 46 at about 30 degrees (perhaps within +/−10 degrees of 30 degrees) helps the bridge to follow the upper part of the ear/head intersection while ensuring the acoustic module inner face 26 sits against the ear and head. It also places housing 48 behind the ear on or very close to the ear/head intersection, along most of the length of the housing. Open audio device 10 is thus held to the ear and head at a plurality of spaced locations. Also, in some examples the thickness of housing 48 (which may be from about 6 mm to about 12 mm) is sufficient such that it will push the outer ear slightly away from the head, as described above. In an example the housing has a generally teardrop cross-sectional shape that becomes progressively wider when moving from a top end of the housing to a bottom end of the housing toward free distal end 50. A teardrop shape has a wider end and a narrower end. In an example the housing is configured such that the wider end of its teardrop cross-sectional shape is located against the ear so that the ear is slightly bent outward, while the narrower end is not in contact with the head or ear for improved comfort.

Figure 4B:
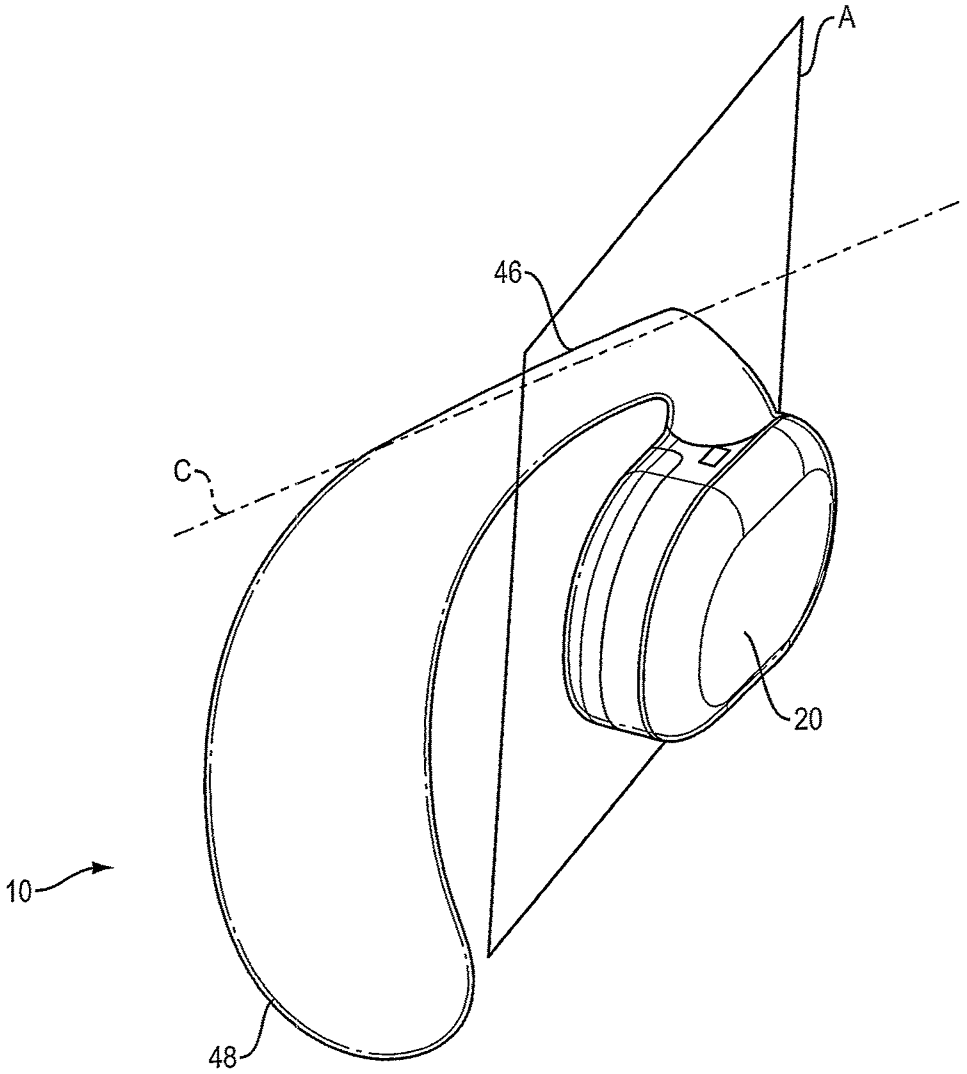

FIG. 4B illustrates another spatial relationship between bridge 46 and acoustic module 20. Plane A is the same plane A illustrated in FIG. 4A. Line C represents the contact rotational axis of bridge 46. In an example line C is angled at (165, 0, 115) degrees from the normal vector of plane A (to a tolerance of approximately +10, −0 degrees). This angle allows acoustic module 20 to closely match the orientation of the ear flesh in that area without pinching or crushing the flesh.

Figure 4C:
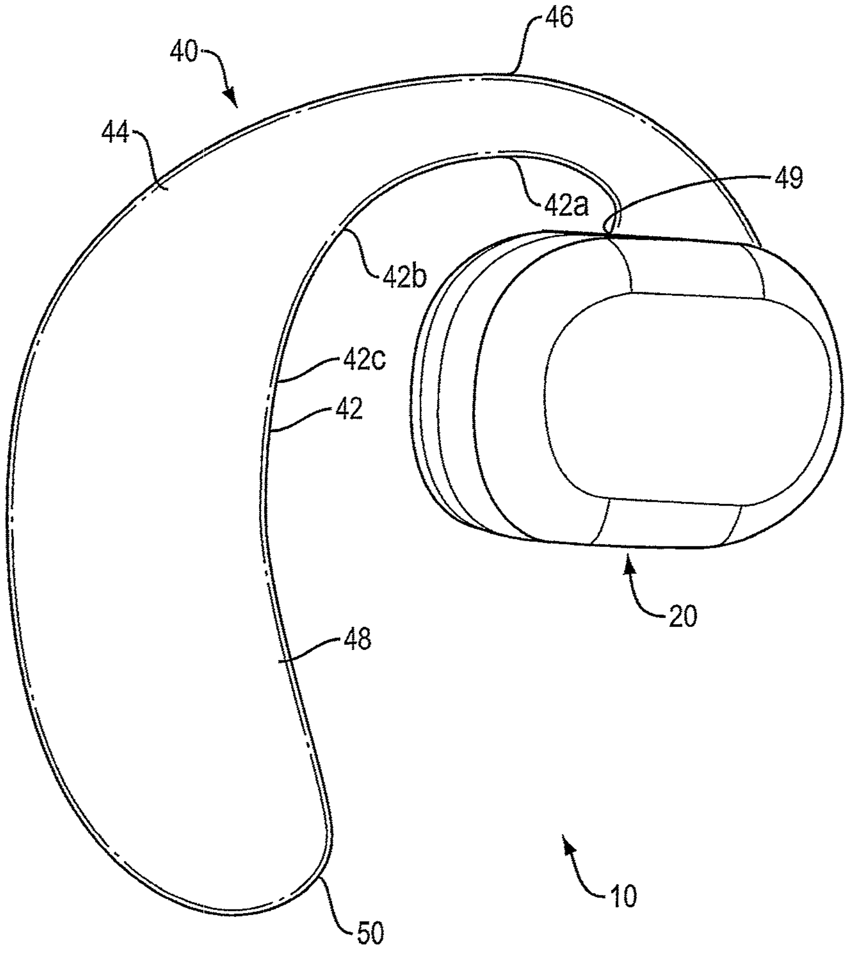
FIG. 4C illustrates aspects of the radii of curvature for the bridge and housing of an open audio device.
Figure 4D:
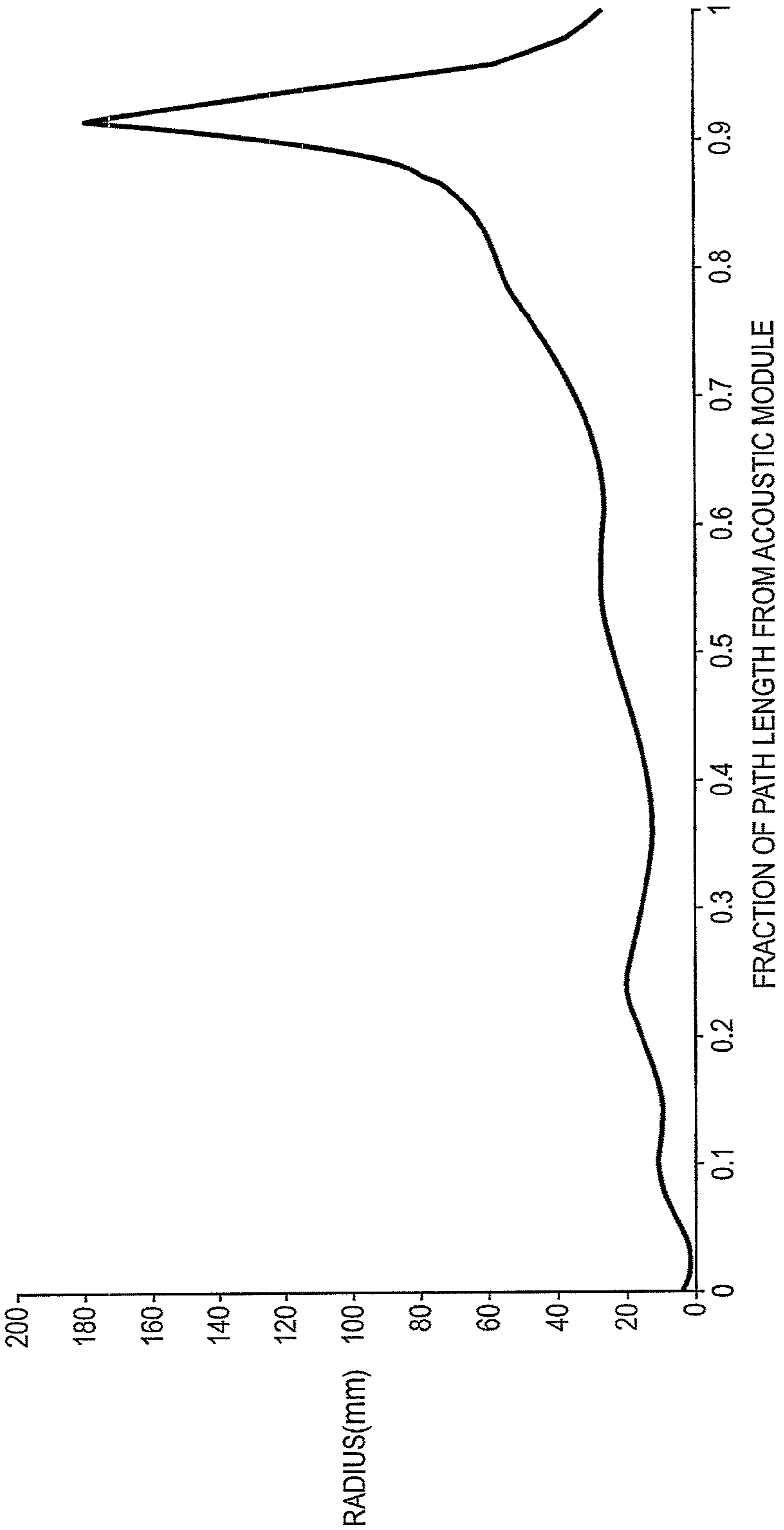
FIG. 4D is a plot of the radius of curvature (in mm) along the length of the body of an open audio device.

FIGS. 4C and 4D illustrate and describe the radii of curvature of an example body 40. Inside surface 42 of body 40 lies generally along a decaying helix. A helix is a smooth curve in three-dimensional space. Surface 42 is not strictly helical but does curve in three-dimensional space, in that free distal end 50 (which is at the distal end of housing 48) is offset from uppermost point 49 of inside surface 42, such that end 50 is closer to the mid-sagittal plane than is point 49. The curve is decaying because its radius of curvature increases when moving from the beginning of the curve at point 49 to its end near free distal end 50 (accordingly, its curvature is greatest at the beginning of the curve at point 49 and decreases when moving down the body towards its end 50). In an example the approximate dimensions of the radius of curvature at several points along surface 42 are as follows: point 49, 3.5 mm; point 42*a,* 5 mm; point 42*b,* 7 mm; point 42*c,* 9 mm.

FIG. 4D is a plot of the radius of curvature along the length of surface 42 (which in one non-limiting example is about 70 mm). The sharp jump and drop starting at between 80-90% of the length and ending at 100% is due to the rounded end 50. Surface 42 is configured to generally follow the ear-head intersection behind the ear in an "average" person, while the length of the housing ensures that in almost every ear anatomy the body will lie on or close to this intersection to a point at least as far down as the otobasion posterius, and in many cases lower than that, close to the lower end of the helix. The thickness of housing 48 is designed to push the outer ear slightly away from the head at least in most anatomies, as described above. In an example the housing has a generally uniform width. Accordingly, the inner 42 and outer 44 curved surfaces of the housing will have approximately the same radii of curvature. The housing is sized and shaped so as to accommodate a traditional cylindrical rechargeable battery, although other battery shapes can be accommodated.

Body 40 can be shaped generally to follow the intersection of the outer ear and the head. Contact along this intersection and/or the head and/or ear abutting this intersection will be at a number of spaced locations along the ear and adjacent head regions. However, since the human head has many shapes and sizes, body 40 does not necessarily contact the intersection of the head and ear. Rather, it can be designed to have a shape such that it will, at least on most heads, contact the back of the outer ear and/or the portion of the head that abuts the back of the outer ear, and the front of the ear above the ear canal opening. These contacts occur at a plurality of spaced locations. These locations can include at least locations that are substantially or generally diametrically opposed.

In an example the bridge can be constructed to have some bending compliance (e.g., by making the bridge of a compliant material, or overmolding a compliant material, such as an elastomer, in a portion that is designed to be able to bend). The bending compliance can be about its longitudinal axis. The bridge can be configured such that the bridge bends slightly when it is pushed down over the top of the ear. The compliance can create forces that gently push the acoustic module and the housing against the head, to better hold the open audio device in place. The compliance can cause a slight compressive force at opposed locations of the open audio device and so can lead to a grip on the ear and head that is sufficient to help retain the open audio device in place as the head is moved.

Also, since at least two of the open audio device-to-ear/head contact points are in the vicinity of the upper part of the ear (due to the acoustic module and the bridge) and lower down on the back of the ear/the head (typically at or below the otobasion posterius 98 due to the shape and curvature of the housing), there are contact points that are generally diametrically opposed. The generally diametrically opposed locations create a resultant force on the open audio device that lies approximately in the line between the opposed contact regions. In this way, the open audio device can be considered stable on the ear. Contrast this to a situation where the lower contact region is substantially further up on the back of the ear, which would cause a resultant force on the open audio device that tended to push it up and rotate it forward, up and off the ear. By arranging contact forces roughly diametrically opposed on the ear, the open audio device can accommodate a wider range of orientations and inertial conditions where the forces can balance, and the open audio device can thus remain on the ear.

Open audio device 10 can be a mainly unitary molded plastic member. The plastic material may have some flexibility so that open audio device is less likely to break if it is sat on or the like. The material may be a nylon or a cellulose acetate (similar to the material used in the frames of some eyeglasses that are able to be bent to a degree without breaking, and then return to their original shape after being bent). Since acoustic module 20 holds an audio driver and electronics used to receive, process and supply audio signals to the driver, the design must account for the need to locate components inside of acoustic module 20. Also, a rechargeable battery is typically contained in housing 48 and wiring needs to run from the battery to the acoustic module.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An open audio device comprising:

an acoustic module configured to be located at least in part on the outer ear, wherein the acoustic module defines a first sound-emitting opening that is configured to be proximate but spaced from the user's ear canal and a second sound-emitting opening that is configured to sit farther from the user's ear canal than the first sound-emitting opening when the device is worn; and a body supporting the acoustic module, the body comprising:

a housing configured to be located behind an outer ear of a user and in contact with at least one of the outer ear and the head proximate the intersection of the head and the outer ear; and a bridge that couples the acoustic module to the housing, wherein the bridge is constructed to have bending compliance, and wherein the acoustic module comprises an audio driver and the first and second sound emitting-openings are configured to emit sound from opposite sides of the audio driver and such that the sounds emitted from the first sound-emitting opening are out of phase with sounds emitted from the second sound-emitting opening.

2. The open audio device of claim 1, wherein the housing accommodates a cylindrical rechargeable battery.

3. The open audio device of claim 2, wherein the body further comprises wiring that runs from the rechargeable battery to the acoustic module.

4. The open audio device of claim 1, wherein the acoustic module carries at least one microphone.

5. The open audio device of claim 4, wherein the acoustic module defines at least one microphone opening that leads to the at least one microphone.

6. The open audio device of claim 1, wherein the acoustic module carries at least two microphones.

7. The open audio device of claim 6, wherein the acoustic module defines at least two microphone openings that leads to the at least two microphones.

8. The open audio device of claim 7, wherein an axis through the at least two microphone openings is within about +/−30 degrees of the expected location of the user's mouth, when the open audio device is worn.

9. The open audio device of claim 7, wherein the two or more microphones are arrayed to direct a beam towards the expected location of the user's mouth.

10. The open audio device of claim 1, wherein the body is configured to contact the user's outer ear and/or a portion of the user's head that is just behind and abuts the user's outer ear, at two or more separate, spaced contact locations.

11. The open audio device of claim 1, wherein the bridge is curved.

12. The open audio device of claim 1, wherein the bridge is thinner than the housing.

13. The open audio device of claim 1, wherein the bending compliance is about a longitudinal axis of the bridge.

14. The open audio device of claim 1, wherein the bridge is formed, at least in part, of an elastomer that enables the compliance.

15. The open audio device of claim 1, wherein the bridge is configured such that it bends when it is pushed down over the user's outer ear.

16. The open audio device of claim 1, wherein the bridge is constructed such that the compliance creates forces that help to hold the open audio device in place when it is worn.

17. The open audio device of claim 1, wherein the bridge is constructed such that the compliance causes compressive force at opposed locations of the open audio device when it is worn.

18. The open audio device of claim 1, wherein the acoustic module has an inner face that is configured to sit against one or more of a fossa, an anti-helix, a crus of helix, and a helix of the user's outer ear.

* * * * *